No. 828,798. PATENTED AUG. 14, 1906.
N. F. ANDERSON.
FRUIT CLIPPER.
APPLICATION FILED AUG. 10, 1905.
2 SHEETS—SHEET 1.
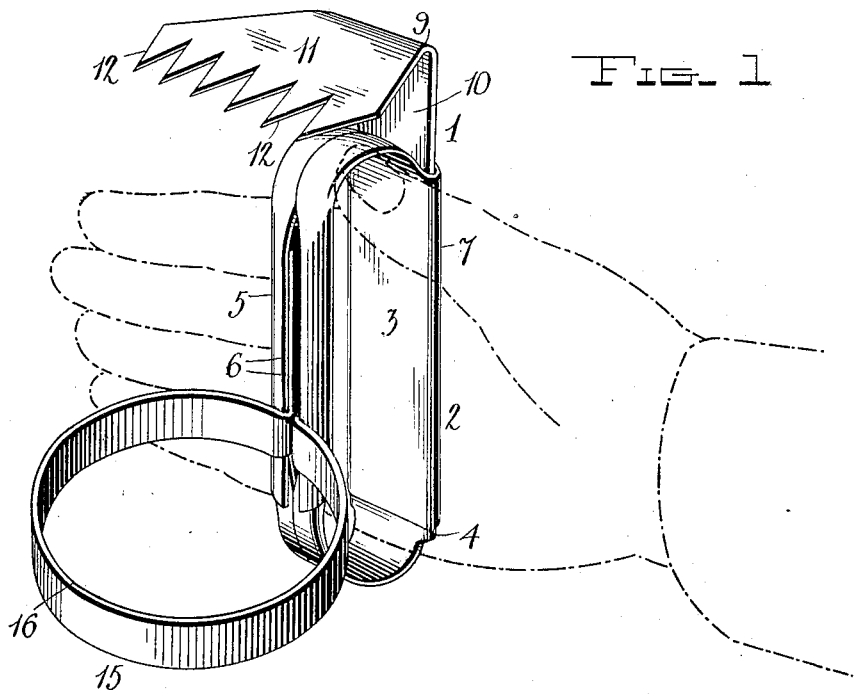
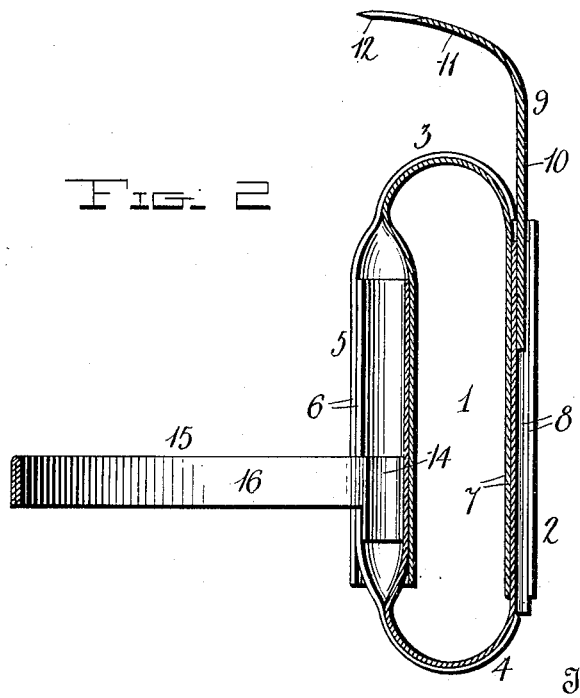
Witnesses
Inventor
Nelson F. Anderson
by H. B. Willson
Attorney No. 828,798. PATENTED AUG. 14, 1906.
N. F. ANDERSON.
FRUIT CLIPPER.
APPLICATION FILED AUG. 10, 1905.
2 SHEETS—SHEET 2.
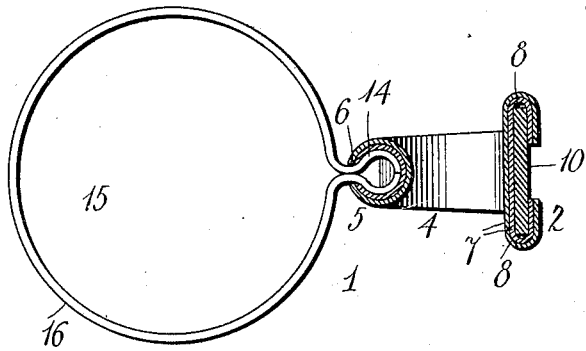
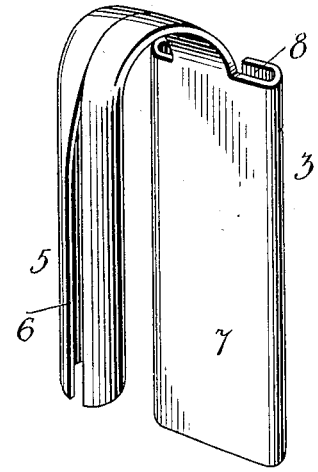
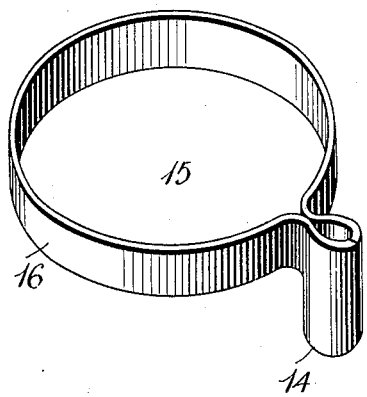
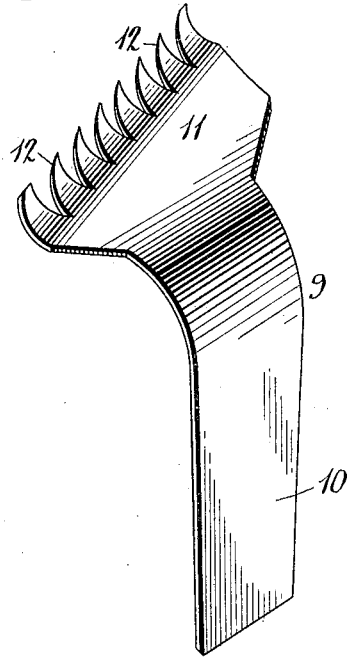
Witnesses
Inventor
Nelson F. Anderson
by H. B. Willson,
Attorney

UNITED STATES PATENT OFFICE.

NELSON F. ANDERSON, OF LOS ANGELES, CALIFORNIA.

FRUIT-CLIPPER.

No. 828,798.  Specification of Letters Patent.  Patented Aug. 14, 1906.

Application filed August 10, 1905. Serial No. 273,619.

*To all whom it may concern:*

Be it known that I, NELSON F. ANDERSON, a citizen of the United States, residing at Los Angeles, in the county of Los Angeles and State of California, have invented certain new and useful Improvements in Fruit and Flower Pickers; and I do declare the following to be a full, clear, and exact description of the invention, such as will enable others skilled in the art to which it appertains to make and use the same.

My invention relates to improvements in knives for picking fruit and flowers.

One object of the invention is to provide a simple, durable, and comparatively inexpensive device of this character by means of which the stems of fruit and flowers may be conveniently cut with the use of one hand only.

Another object of the invention is to provide a device of this character having adjustable handles and interchangeable blades, so as to adapt it to various uses.

Another object of the invention is to provide a device of this character with means whereby fruit may be sized before being picked.

With the above and other objects in view my invention consists in the novel construction, combination, and arrangement of devices hereinafter described and claimed.

In the accompanying drawings, Figure 1 is a perspective view showing the application of my improved fruit-picking knife or tool. Fig. 2 is a vertical longitudinal sectional view through the same. Fig. 3 is a transverse sectional view. Fig. 4 is a perspective view of one of the sections of the handle. Fig. 5 is a perspective view of the fruit-sizing ring, and Fig. 6 is a perspective view of a slightly-modified form of cutting-blade.

Referring to the drawings by numeral, 1 denotes my improved tool which comprises an adjustable handle 2, formed, preferably, of two slidable telescoping members 3 4. These members are similar in construction, each being of substantially U form and having one arm or end in the form of a cylindrical tube 5, which is slotted longitudinally, as at 6, and its other arm or end 7 flattened and provided along its sides with longitudinally-extending grooves 8. As shown in the drawings, each of the sections 3 4 is formed from a single piece of sheet metal by cutting or bending the same; but it will be understood that the same may be cast or formed in any other suitable manner. The arms 5 and 7 of the upper member 3 are adapted to receive the corresponding parts of the lower member 4, the slots 6 in the cylindrical portions 5 being adapted to register with each other, and the turned-over edges of the part 7 of the lower member 4 being adapted to enter the grooves formed by the corresponding portions of the upper member. It will be seen that by adjusting the members 3 and 4 upon each other the length of the handle may be varied to adapt it to the hand of the user, who grasps the tool as shown in Fig. 1 of the drawings. The grooves 8 in the ends 7 of the members also serve as sockets to receive cutter-blades 9. The latter, as shown in Figs. 1 to 3, inclusive, of the drawings, has a flattened shank 10, which is adapted to enter the grooves 8, and a curved or angularly-projecting blade portion 11, which has its outer edge serrated and sharpened to form cutting-teeth 12. The blade shown in Fig. 6 of the drawings is formed similarly to the one just described, the only difference being the shape of its portion 11, the greater number of teeth 12, and the curvature of the same. Owing to the peculiar shape and the angular disposition of the blade portion 11, this cutter is particularly adapted for cutting oranges, lemons, and the like, while the cutter first described is better adapted for cutting flowers, grapes, and the like. It will be seen that these cutters may be applied to either end of the handle.

The slots 6 are provided in the hand gripping portions 5 of the handle members for the purpose of receiving the end or shank 14 of a sizing device 15. The latter is in the form of a ring or circular loop which has its ends brought together and formed with a head which is adapted to enter the cylindrical portions of the handle members, as clearly shown in the drawings. This sizing-ring 16 is only used when picking lemons or other fruit which it is desired to size while being picked. When applied, said ring 15 is disposed adjacent to the lower end of the handle, so that the picker may readily slip the ring beneath the lemon or other fruit, and if it is of the desired size lower the ring, grasp the fruit between the thumb and first two fingers, and then sever its stem by giving the device a twist to cause the cutter to engage the stem of the fruit. It will be understood that these rings 15 are made in various sizes and that they may be readily applied to or removed from the handle by separating its sections 3 4.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A fruit and flower picker comprising a handle-loop to receive the hand and having longitudinal grooves in one side, and a cutter having a shank in said grooves, and a blade at one end of said shank projecting laterally therefrom.

2. A fruit and flower picker comprising a handle-loop to receive the hand, a cutter-blade having a shank projecting longitudinally from the handle-loop, and a sizing-ring projecting laterally from the handle-loop.

3. A device of the character described comprising two substantially U-shaped handle members having their ends telescoping each other, sockets upon the ends of said members, a cutter removably mounted in one of said sockets, and a sizing-ring removably mounted in another of said sockets, substantially as described.

4. A device of the character described comprising two substantially U-shaped handle members having their ends telescoping each other, one pair of said ends being flat and grooved and the other pair being tubular and slotted, and a sizing-ring having a head to enter the cylindrical ends of said members, substantially as described.

5. A device of the character described comprising two substantially U-shaped handle members having their ends telescoping each other, one pair of said ends being flat and grooved and the other pair being tubular and slotted, a sizing-ring having a head to enter the cylindrical ends of said members, and a cutter removably mounted in the flattened end of one of said members, substantially as described.

In testimony whereof I have hereunto set my hand in presence of two subscribing witnesses.

NELSON F. ANDERSON.

Witnesses:
E. H. MIX,
FRANK L. PERRY.